(12) United States Patent
Pichette (10) Patent No.: US 10,876,739 B2
(45) Date of Patent: Dec. 29, 2020

(54) MULTI-FUNCTION PRESSURE VESSEL

(71) Applicant: LES SOLUTIONS CALEFACTIO INC., Blainville (CA)

(72) Inventor: Jean Pichette, Blainville (CA)

(73) Assignee: LES SOLUTIONS CALEFACTIO INC., Blainville (CA)

( * ) Notice: Subject to any disclaimer, the term of this patent is extended or adjusted under 35 U.S.C. 154(b) by 497 days.

(21) Appl. No.: 15/736,496

(22) PCT Filed: Jun. 10, 2016

(86) PCT No.: PCT/CA2016/050666
§ 371 (c)(1),
(2) Date: Dec. 14, 2017

(87) PCT Pub. No.: WO2016/201554
PCT Pub. Date: Dec. 22, 2016

(65) Prior Publication Data
US 2018/0135867 A1 May 17, 2018

Related U.S. Application Data

(60) Provisional application No. 62/181,412, filed on Jun. 18, 2015.

(51) Int. Cl.
*F24D 19/00* (2006.01)
*F24D 19/08* (2006.01)
(Continued)

(52) U.S. Cl.
CPC ............ *F24D 3/1008* (2013.01); *F16J 12/00* (2013.01); *F24D 3/1016* (2013.01);
(Continued)

(58) Field of Classification Search
CPC .. F24D 3/1008; F24D 3/1016; F24D 19/0092; F24D 19/083; F24D 2220/0278
See application file for complete search history.

(56) References Cited

U.S. PATENT DOCUMENTS 3,744,527 A * 7/1973 Mercier ................ F16L 55/054
2008/0099093 A1* 5/2008 Young .................. F16L 55/054
(Continued)

FOREIGN PATENT DOCUMENTS

CN 2740932 11/2005
CN 202769162 3/2013
(Continued)

OTHER PUBLICATIONS

International Search Report of corresponding PCT application No. PCT/CA2016/050666.

*Primary Examiner* — Avinash A Savani
*Assistant Examiner* — Deepak A Deean
(74) *Attorney, Agent, or Firm* — Norton Rose Fulbrighg Canada LLP (57) ABSTRACT

A multi-function pressure vessel suited for installation in a heat transfer fluid system. The multi-function pressure vessel comprises: a tank defining an internal volume, a bladder dividing the internal volume into a heat transfer fluid chamber for ac commodating expansion fluid and a pressurized gas chamber adapted to be filled with a pressurized gas. The tank has a heat transfer fluid inlet for receiving an incoming flow of heat transfer fluid from the heat transfer fluid system and a heat transfer fluid outlet connected in fluid flow communication with the heat transfer fluid inlet by an internal pipe mounted in the heat transfer fluid chamber. The internal pipe has perforations defined therein. An air vent at an upper end of the heat transfer fluid chamber is provided for venting any air bubbles passing through the perforations in the internal pipe. A drain valve may be provided at a bottom end of the heat transfer fluid chamber for removing dirt particles flowing through the perforations in the internal pipe.

17 Claims, 8 Drawing Sheets

(51) Int. Cl.
*F24D 3/10* (2006.01)
*F16J 12/00* (2006.01)

(52) U.S. Cl.
CPC ....... *F24D 19/0092* (2013.01); *F24D 19/083* (2013.01); *F24D 2220/0278* (2013.01)

(56) References Cited

U.S. PATENT DOCUMENTS

2011/0240161 A1* 12/2011 Schneider ............. F24D 3/1008
2013/0180993 A1* 7/2013 Pichette ................ F24D 3/1008

FOREIGN PATENT DOCUMENTS

DE 102013225179 6/2015
EP 2918737 9/2015
GB 2183299 6/1987

\* cited by examiner

MULTI-FUNCTION PRESSURE VESSEL

TECHNICAL FIELD

The application relates generally to heat transfer fluid systems and, more particularly, to a device combining multi-functions, such as those of an expansion tank, a deaerator and a dirt separator, into a single unit.

BACKGROUND OF THE ART

It is well known to use expansion tanks in closed looped heat transfer fluid systems to accommodate increases in volume resulting from the temperature rise of non-compressible heating fluids, such as water, glycol, glycerine and propylene glycol solutions. Such expansion tanks allow controlling the system operating pressure by providing to the expanded heat transfer fluid a place to go.

It is also well known to install separate air removal devices and dirt separators at strategic locations in closed loop heat transfer fluid systems. The use of separate devices such as expansion tanks, deaerators and dirt separators along the piping network of heat transfer fluid system requires more space, increases the costs and necessitate additional installation time.

SUMMARY

It is therefore an object to combine the function of an expansion tank, a deaerator and a dirt separator into a single device.

In one aspect, there is provided a multi-function pressure vessel for installation in a heat transfer fluid system, the multi-function pressure vessel comprising: a tank adapted to be mounted in a line of the heat transfer fluid system, the tank having a heat transfer fluid inlet and a heat transfer fluid outlet, a bladder mounted inside the tank, a pressurized gas chamber surrounding the bladder inside the tank, the bladder defining a variable internal volume for accommodating expansion fluid from the heat transfer fluid system, and an internal pipe extending from the heat transfer fluid inlet to the heat transfer fluid outlet through the bladder, the internal pipe including a plurality of perforations opening to the variable internal volume of the bladder, the bladder having a vent opening connected to the tank about an air vent at an upper end of the tank.

In another aspect, there is provided a combined expansion tank, deaerator and dirt separator unit for installation in a line of a heat transfer fluid system, the unit comprising: a tank having a heat transfer fluid inlet and a heat transfer fluid outlet, an internal pipe inside the tank, the internal pipe extending from the heat transfer fluid inlet to the heat transfer fluid outlet, a bladder mounted about the internal pipe inside the tank, the bladder and the tank defining therebetween a pressurized gas chamber, the internal pipe having perforations defined therethrough, the perforations fluidly linking the internal pipe and the bladder, the bladder having a vent opening connected to the tank about an air vent provided at an upper end of the tank for venting air bubbling through the perforations defined in the internal pipe, and wherein the bladder further has a drain opening connected to the tank about a drain valve at a bottom end of the tank for allowing removal of dirt particles flowing through the perforations of the internal pipe.

In another aspect, there is provided a multi-function pressure vessel suited for installation in a heat transfer fluid system, the multi-function pressure vessel comprising: a tank defining an internal volume, a bladder dividing the internal volume into a heat transfer fluid chamber for accommodating expansion fluid and a pressurized gas chamber adapted to be filled with a pressurized gas, the tank having a heat transfer fluid inlet for receiving an incoming flow of heat transfer fluid from the heat transfer fluid system and a heat transfer fluid outlet connected in fluid flow communication with the heat transfer fluid inlet by an internal pipe mounted in the heat transfer fluid chamber, the internal pipe having an upstream segment, an upstanding vent pipe segment and a downstream segment, the internal pipe being perforated, a baffle being provided in the pipe at a junction of the upstream segment, the upstanding vent pipe segment and the downstream segment to cause the incoming heat transfer fluid to flow upwardly into the upstanding vent pipe segment before being discharged through the downstream segment and the heat transfer fluid outlet, an air vent at an upper end of the heat transfer fluid chamber for venting any air bubbles passing through perforations in an upwardly facing surface of the upstream and downstream segments of the internal pipe, and a drain valve at a bottom end of the heat transfer fluid chamber for allowing removal of any dirt particles flowing through perforations on a downwardly facing surface of the upstream and downstream segments of the internal pipe.

In accordance with a further aspect, there is provided a multi-function pressure vessel suited for installation in a heat transfer fluid system, the multi-function pressure vessel comprising: a tank defining an internal volume, a bladder dividing the internal volume into a heat transfer fluid chamber for accommodating expansion fluid and a pressurized gas chamber adapted to be filled with a pressurized gas, the tank having a heat transfer fluid inlet for receiving an incoming flow of heat transfer fluid from the heat transfer fluid system and a heat transfer fluid outlet connected in fluid flow communication with the heat transfer fluid inlet by an internal pipe mounted in the heat transfer fluid chamber, the internal pipe having perforations defined therein, an air vent at an upper end of the heat transfer fluid chamber for venting any air bubbles passing through the perforations in the internal pipe, and a drain valve at a bottom end of the heat transfer fluid chamber for allowing removal of any dirt particles discharged through the perforations in the internal pipe.

Further details of these and other aspects of the present invention will be apparent from the detailed description and figures included below.

DESCRIPTION OF THE DRAWINGS

Reference is now made to the accompanying figures, in which.

DETAILED DESCRIPTION

Figure 1:
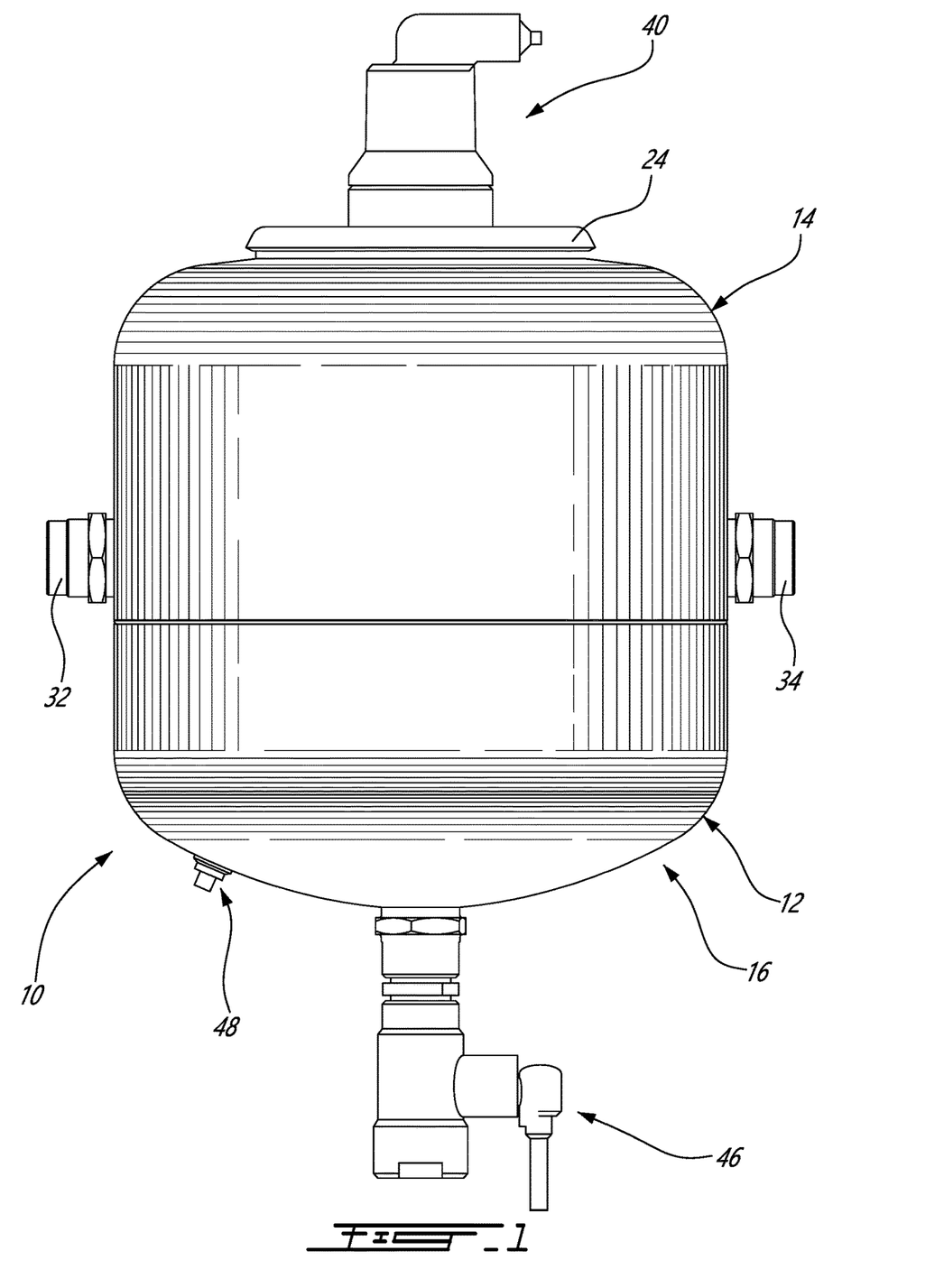
FIG. 1 is a side view of a multi-function pressure vessel combining the function of an expansion tank, a deaerator and a dirt separator.
Figure 2:
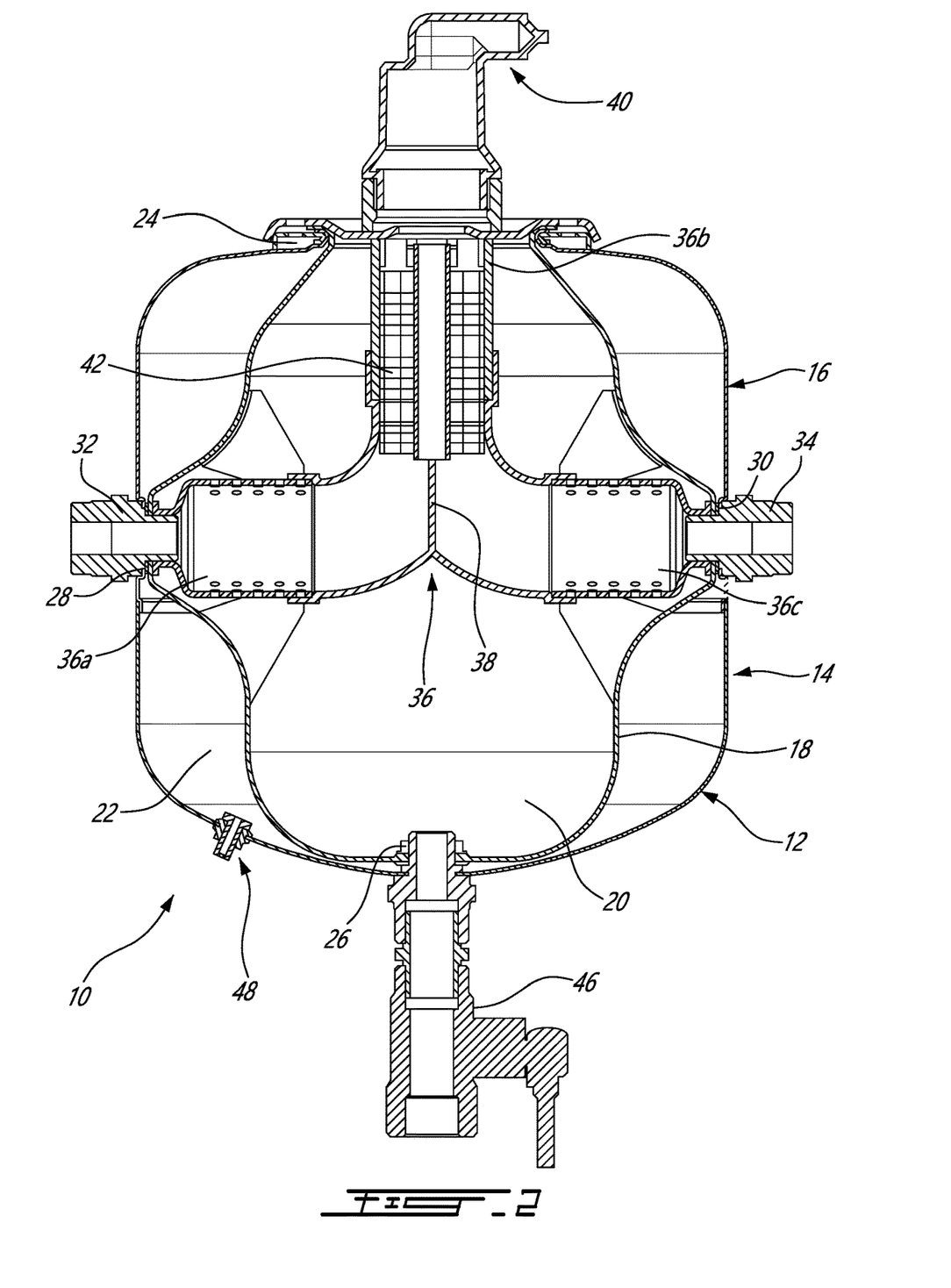
FIG. 2 a cross-sectional view of the multi-function pressure vessel of FIG. 1.

FIGS. 1 and 2 illustrate a multi-function pressure vessel 10 adapted to be mounted in a line of a heat transfer fluid system (for instance on the outlet side of a boiler or on the mixing valve outlets if mixing valves are used). According to an embodiment of the present invention, the multi-function pressure vessel 10 combines the functions of an expansion tank, a deaerator and a dirt separator into a single unit. Indeed, as will be seen hereinafter, the multi-function vessel 10 is adapted to accommodate increases in volume resulting from the temperature rise of non-compressible heat transfer fluids, while at the same time removing entrained air and dirt from the fluid as the same flows through the vessel. The heat transfer fluid may be water, glycol, glycerine and propylene glycol solutions, a mixture of water and glycol or any other fluids that may be used in a heat transfer fluid system.

The pressure vessel 10 generally comprises a tank 12 including top and bottom half-shell members 14, 16 assembled together such as by welding, clamping or other suitable techniques. The top and bottom shell members 14, 16 may be made out of plastic, metal or any suitable materials.

The top and bottom shell members 14, 16 define therebetween a relatively large internal volume. A flexible elastomeric bladder 18 divides the internal volume into a heat transfer fluid chamber 20 and a surrounding pressurized gas chamber 22. The bladder 18 may be made out of rubber, EPDM, butyl or other suitable materials. As shown in FIG. 2, the bladder 18 may be mounted at an upper end thereof to a mounting flange 24 provided at a top end wall of the top shell member 14. The bladder 18 is mounted at its lower end to a second mounting flange 26 mounted to a bottom end wall of the bottom shell member 16 opposite to the top end wall of the top shell member 14. The bladder 18 is also removably attached to respective mounting flanges 28, 30 of heat transfer fluid inlet and outlet ports 32, 34 mounted in alignment on opposed sides of the tank 12 approximately midway between the top and bottom ends of the tank. Accordingly, the bladder has four openings defined therein to provide for four points of attachment to the tank. The top or upper opening is a vent opening adapted to be secured to the tank about an air vent providing a deaerating function. The bottom or lower opening is adapted to be secured to the tank about a drain to provide a dirt removal function. The lateral openings are secured about the fluid inlet and outlet ports.

Figure 3:
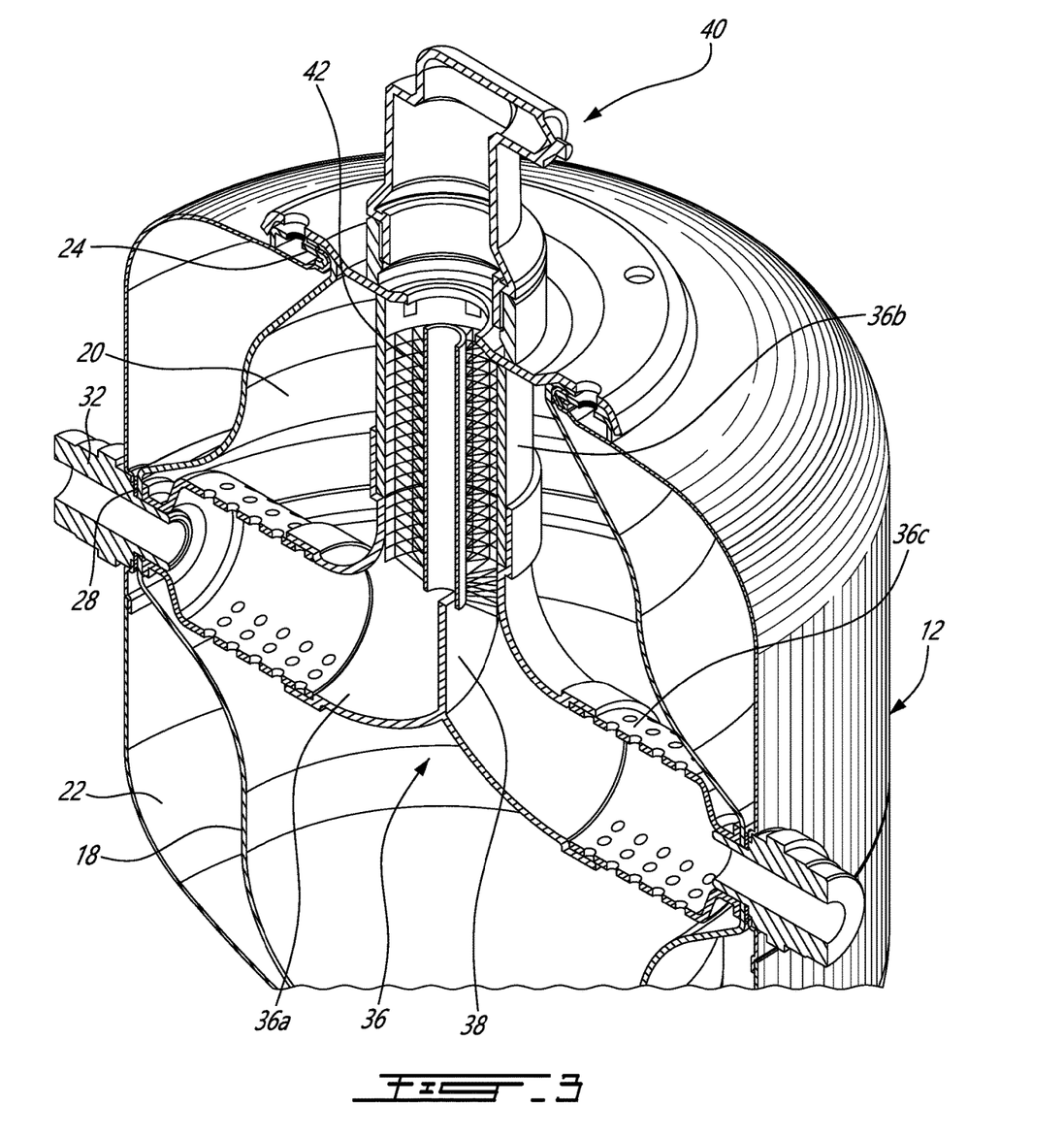
FIG. 3 is an isometric cross-section view illustrating an internal T-shaped pipe mounted within a bladder dividing the internal volume of the vessel into a heat transfer fluid and a surrounding pressurized gas chamber.
Figure 4:
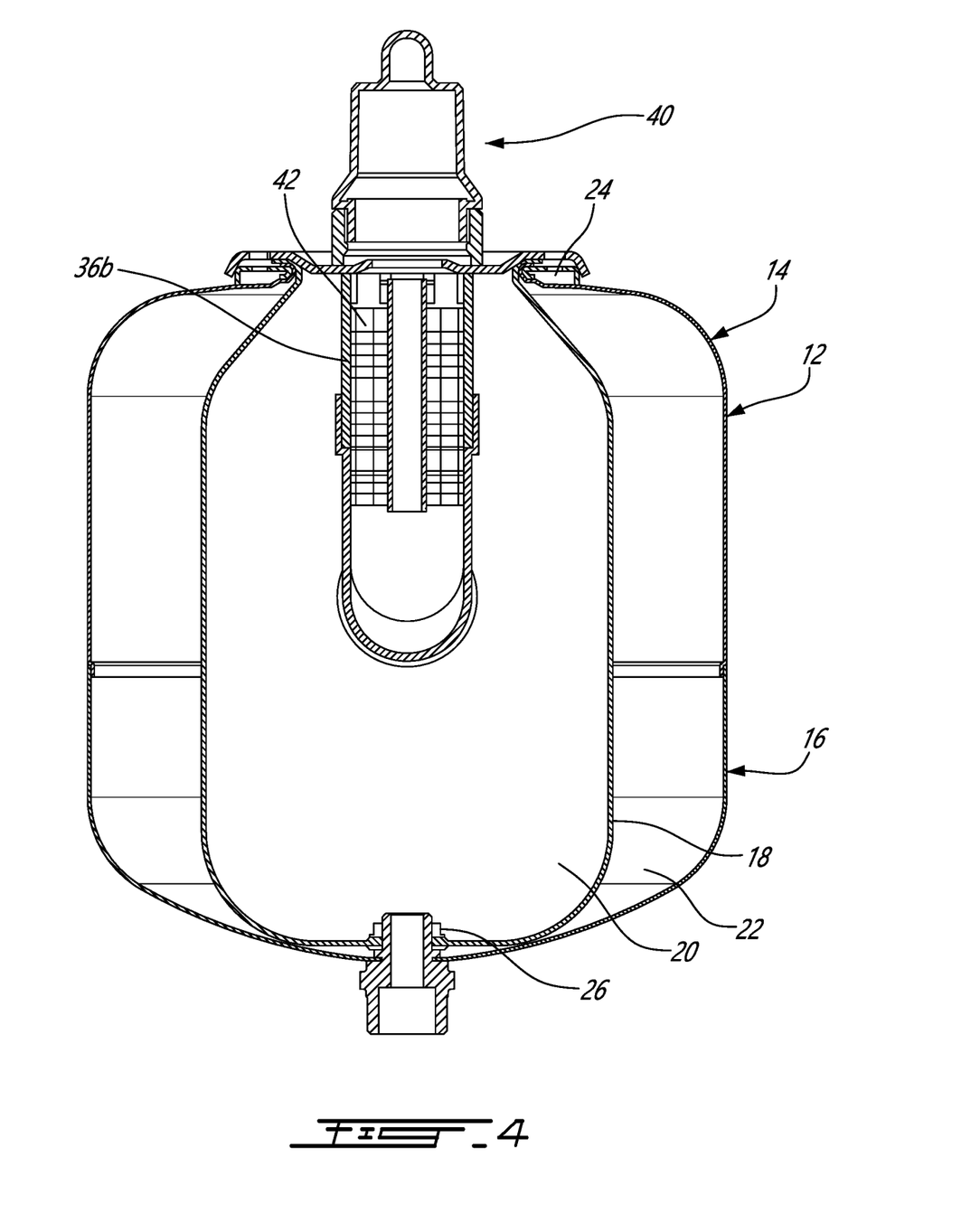
FIG. 4 is a cross-section view illustrating the bladder in an expanded state under the action of the expansion fluid inside the bladder.

The heat transfer fluid inlet 32 is adapted to be connected in fluid flow communication with the pipe network of the heat transfer fluid system for receiving incoming heat transfer fluid therefrom. The heat transfer fluid outlet 34 is connected in fluid flow communication with the heat transfer fluid inlet 32 by an internal pipe 36 mounted in the heat transfer fluid chamber 20 defined by the bladder 18. In the illustrated embodiments, the internal pipe has an inverted T-shaped configuration. However, it is understood that the internal pipe could adopt other configurations. For instance, it could have an S-shape. The exemplified internal pipe 36 has an upstream leg 36a connected to the inlet port 32, an upstanding vent pipe leg 36b (or chimney), and a downstream leg 36c connected to the outlet port 34. The upstream and downstream legs 36a, 36c are perforated, thereby allowing expansion fluid to flow out of the pipe 36 into the heat transfer fluid chamber 20 defined by the bladder 18. A baffle 38 may be provided in the internal pipe 36 at the junction of the upstream leg 36a, the upstanding leg 36b and the downstream leg 36c. The baffle 38 causes incoming heat transfer fluid to flow upwardly into the upstanding leg 36b before flowing back down into the downstream leg 36c and the outlet port 34.

A high capacity air vent 40 is mounted to the mounting flange 24 on the top end wall of the top shell member 14 for removing entrained air bubbling to the top of the heat transfer fluid chamber 20. As schematically depicted by bubbles A1 in FIG. 6, a major portion of the well-formed larger bubbles entrained by the heat transfer fluid will (due to their greater rise velocities) naturally flow out of the perforations defined in the upstream leg 36a to the upper end of the heat transfer fluid chamber 20 where they will be vented to the atmosphere through the air vent 40. The air removal efficiency through the perforations of the upstream leg 36a is function of the velocity of the flow stream. Lower velocities increase the air removal efficiency. According to an embodiment, the cross-section of the upstream leg may be sized to reduce the flow velocity of the incoming heat transfer fluid below about 4 feet per second.

Figure 6:
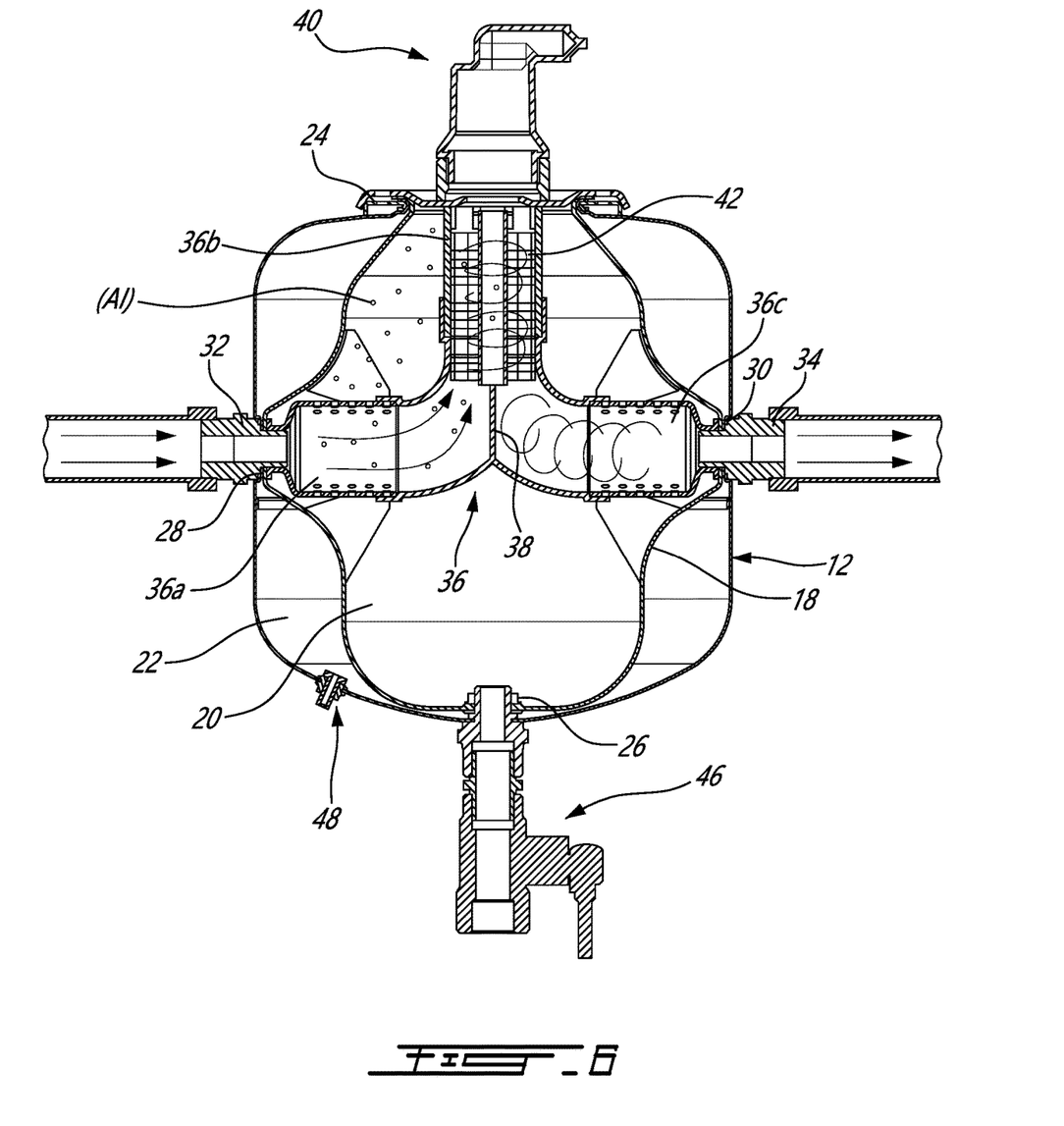
FIG. 6 is a cross-section view illustrating the air removal process of entrained air from the heat transfer fluid.

The baffle 38 also contributes to enhance the air removal process by imparting an upward velocity component to the fluid flow, thereby giving an upward momentum to air bubbles.

A coalescing media 42 may be provided in the upstanding air vent leg 36b of the pipe to capture the more challenging form of entrained air, i.e. the micro-bubbles. The micro-bubbles are known to have low rise velocities and are easily entrained by moving fluids. This characteristic makes it more difficult to capture micro-bubbles relative to well-formed larger bubbles. The coalescing media in the upstanding air vent pipe leg 36b of the internal pipe 36 provides a surface upon which the micro-bubbles can cling and eventually merge into larger bubbles. As micro-bubbles coalesce together, they form larger bubbles. Eventually the bubbles reach a volume large enough that buoyancy forces overcome the adhesion forces holding them to the coalescing surface. The bubbles then rise along the coalescing surface to the air vent 40 where they are expelled to the atmosphere. As shown in FIGS. 2 to 6, the coalescing media 42 may be provided in the form of an open mesh cartridge which may be removably loaded into the upstanding leg 36b of the pipe. The open mesh cartridge may adopt various configuration providing high surface contact area and a relatively low pressure drop.

Figure 7:
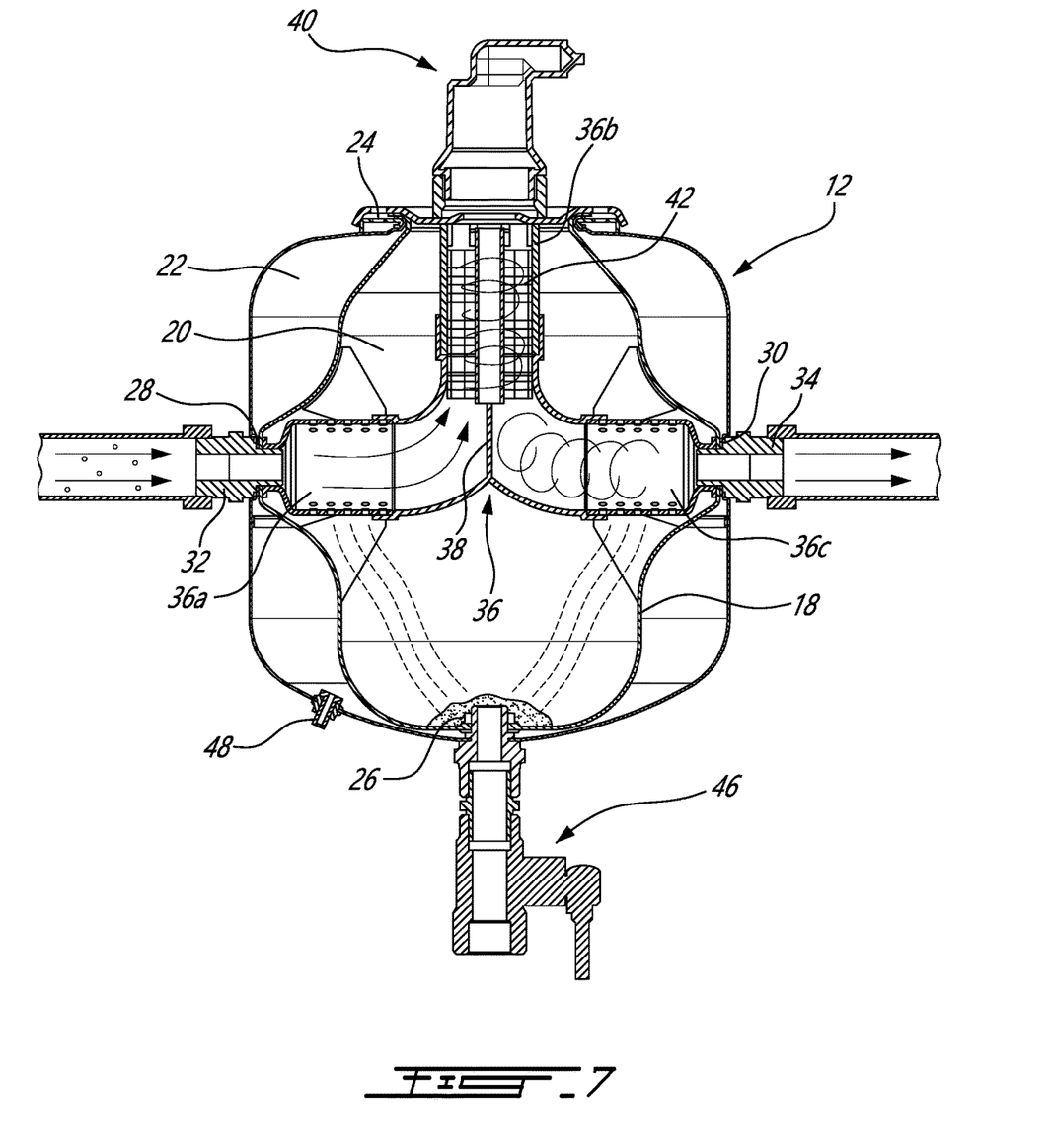
FIG. 7 is a cross-section view illustrating the dirt removal process of dirt particles from the heat transfer fluid.

Now referring to FIG. 7, it can be appreciated that the internal perforated T-shaped pipe 36 provides a suitable low-velocity particle separator zone which may be advantageously coupled with a drain valve 46 mounted to the mounting flange 26 at the bottom of the tank 12 for capturing and expelling dirt particles from the heat transfer fluid flowing through the tank 12. As mentioned herein above, the flow velocity may be reduced by the wider cross-section of the internal pipe 36. Flow velocities of less than 4 feet per second are preferable. As schematically shown in FIG. 7, at such low flow velocities, the entering dirt particles naturally tend to move downward due to their density. The dirt particles will thus pass through the perforations defined in the bottom facing surface of the upstream and downstream pipe segments 36a, 36c before settling down to the bottom of the heat transfer fluid chamber 20. The drain valve 46 may be periodically opened to remove the dirt particles from the bottom of the heat transfer fluid chamber 20.

Figure 5:
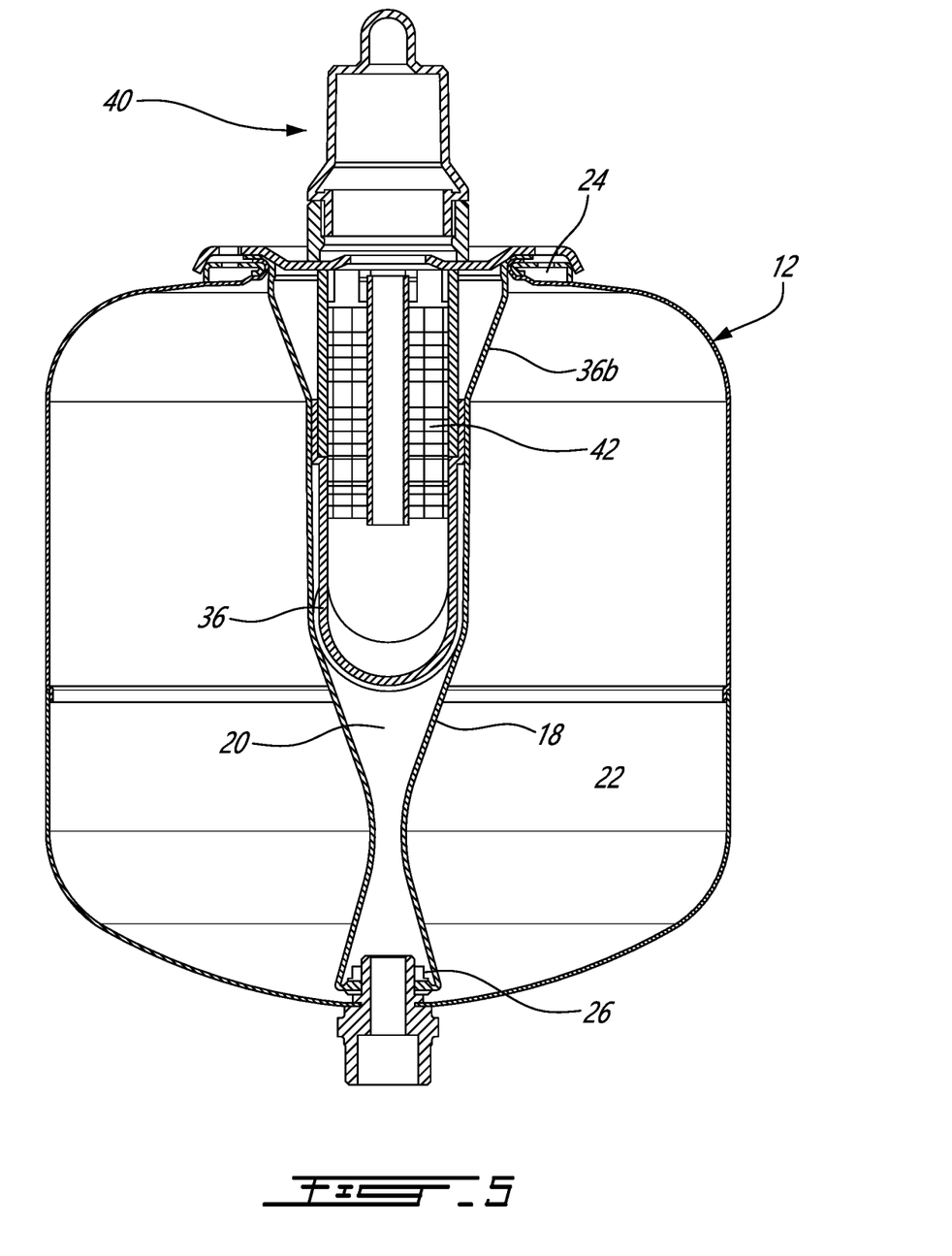
FIG. 5 is a cross-section view illustrating the bladder in a collapsed state against the internal T-shaped pipe when the vessel is pressurized and no expansion fluid is accommodated in the bladder.

As shown in FIGS. 1, 2, 6 and 7, a valve or a closable port 48 may be provided on the top or bottom shell members 14, 16 (the bottom one in the illustrated example) and operatively connected to a source of pressurized gas (e.g. air) to pressurize the pressurized chamber 22 to a predetermined pressure. Once the desired pressure is reached, the port 48 is closed. When the system is not in operation, the temperature of the heat transfer fluid is at ambient temperature and, thus, the system has no expansion fluid. As shown in FIG. 5, in this situation, the bladder 18 is collapsed against the internal pipe 36 under the action of the pressurized fluid in the pressurized chamber 22. However, due to the presence of the internal pipe 36, fluid flow through the multi-function vessel 10 and, thus, through the system is not impeded by the collapsing of the bladder 18. Therefore, even when no expansion fluid is present in the system, the multi-function vessel 10 can still perform its air and dirt removal functions.

When the heat transfer fluid is heated, it expands into the bladder 18 via the perforations in the upstream and downstream pipe segments 36a, 36c, thereby causing the bladder 16 to inflate in order to accommodate the expansion of the fluid in the system. In such circumstances, the multi-function pressure vessel can fully assume all three of its integrated functions.

In view of the foregoing, it can be appreciated that the above described embodiment takes advantage of the relatively large volume offered by an expansion tank to reduce the flow velocity of the heat transfer fluid and integrate air and dirt removal functions into the expansion tank. This reduces the overall number of devices that need to be installed and, therefore, reduces installation time and costs.

Figure 8:
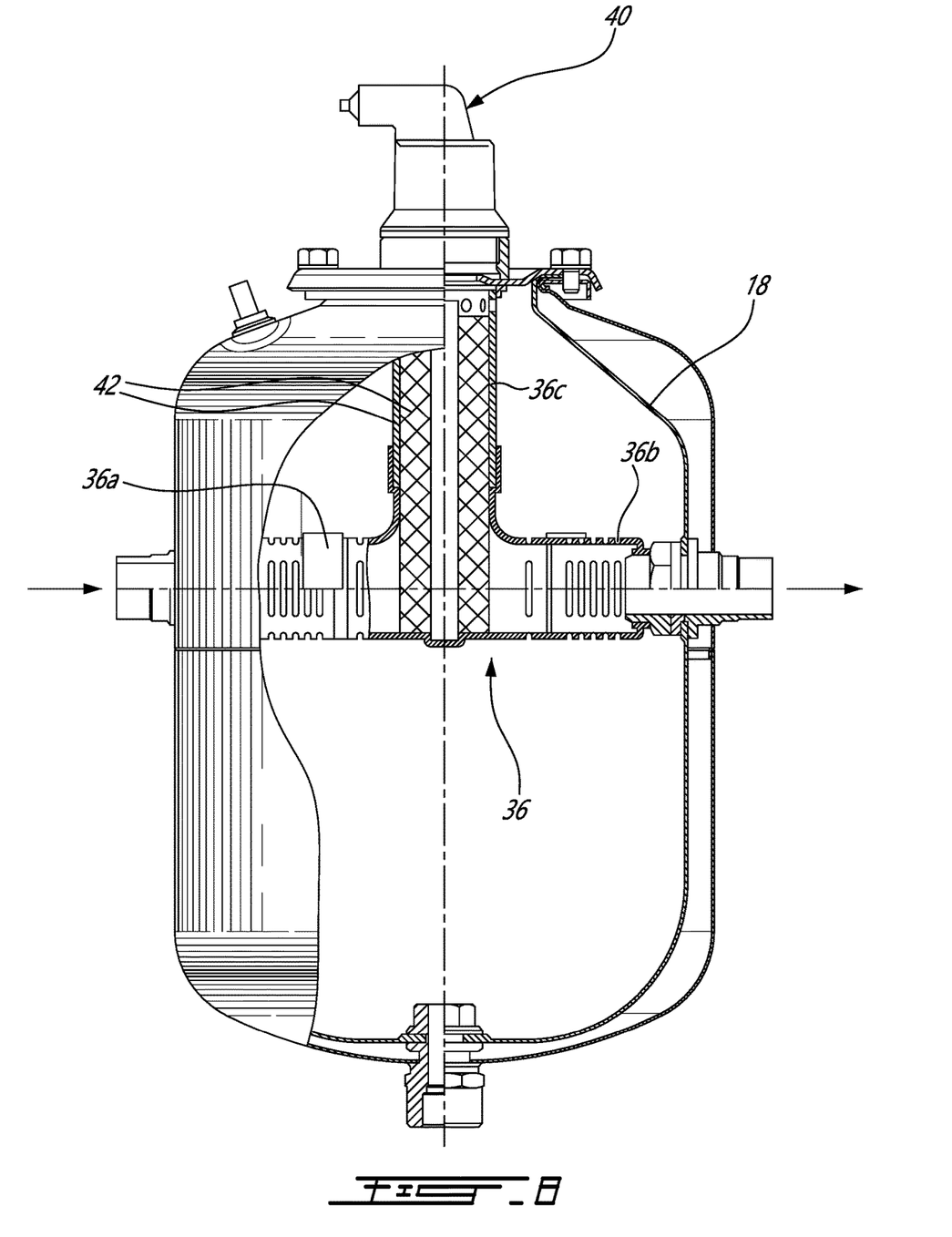
FIG. 8 is a partly broken away view of another embodiment of the present invention.

As shown in FIG. 8, the baffle may be omitted. According to this example, the coalescing media cartridge 42 may extend down through the flow path defined by the upstream and downstream pipe segments or legs 36a, 36c. The cartridge can take the form of a cylindrical screen filled with coalescing particles. It is understood that the cartridge does not have to extend the full height of the upstanding leg of to pipe. Also, it can be appreciated from FIG. 8 that the perforations in the internal pipe 36 can be provided in the form of elongated slots oriented transversally with respect to a flow direction of the heat transfer fluid through the upstream and downstream legs 36a, 36c of the internal pipe 36. For instance, axially spaced-apart rows of circumferentially spaced-apart slots may be defined in the upstream and downstream legs of the internal pipe. From FIG. 8, it can also be seen that side openings may be defined in the upper end of the upstanding leg 36c of the pipe 36 to allow air bubbles bubbling to the top of the internal volume of the bladder 18 to be vented through the air vent 40.

It is understood that the features of the embodiment shown in FIG. 8 could be integrated to the embodiment of FIGS. 1 to 7 and vice versa. Various changes in the details of the described embodiments can be made without departing from the scope of the invention as defined by the appended claims.

What is claimed is:

1. A multi-function pressure vessel for installation in a heat transfer fluid system, the multi-function pressure vessel comprising: a tank adapted to be mounted in a line of the heat transfer fluid system, the tank having a heat transfer fluid inlet and a heat transfer fluid outlet, a bladder mounted inside the tank, a pressurized gas chamber surrounding the bladder inside the tank, the bladder defining a variable internal volume for accommodating expansion fluid from the heat transfer fluid system, and an internal pipe extending from the heat transfer fluid inlet to the heat transfer fluid outlet through the bladder, the internal pipe including a plurality of perforations opening to the variable internal volume of the bladder, the bladder having a vent opening connected to the tank about an air vent at an upper end of the tank.

2. The multi-function pressure vessel defined in claim 1, wherein the bladder further has a drain opening connected to a drain valve provided at the bottom of the tank.

3. The multi-function pressure vessel defined in claim 1, wherein the internal pipe includes a chimney connected to the air vent, and wherein a coalescing media is provided in the chimney.

4. The multi-function pressure vessel defined in claim 3, wherein the coalescing media is provided in the form of a cartridge of mesh material.

5. The multi-function pressure vessel defined in claim 3, wherein the internal pipe has an invert T-shaped configuration including an upstanding leg connected to the air vent at the upper end of the tank, and wherein a cartridge of coalescing media is loaded into the upstanding leg of the internal pipe.

6. The multi-function pressure vessel defined in claim 1, wherein the perforations in the internal pipe comprise elongated slots.

7. The multi-function pressure vessel defined in claim 2, wherein the bladder has four points of attachment to the tank, a first one being at the air vent, a second one being at the drain valve, a third one being at the heat transfer fluid inlet, and a fourth one being at the heat transfer fluid outlet.

8. The multi-function pressure vessel defined in claim 5, wherein the upstanding leg of the internal pipe has side openings defined at an upper distal end thereof, said side openings fluidly linking the variable internal volume of the bladder to the air vent.

9. The multi-function pressure vessel defined in claim 1, wherein the internal pipe has an invert T-shaped configuration including an upstanding leg connected to the air vent, and wherein a baffle is provided in the internal pipe at a bottom end of the upstanding leg.

10. A combined expansion tank, deaerator and dirt separator unit for installation in a line of a heat transfer fluid system, the unit comprising: a tank having a heat transfer fluid inlet and a heat transfer fluid outlet, an internal pipe inside the tank, the internal pipe extending from the heat transfer fluid inlet to the heat transfer fluid outlet, a bladder mounted about the internal pipe inside the tank, the bladder and the tank defining therebetween a pressurized gas chamber, the internal pipe having perforations defined therethrough, the perforations fluidly linking the internal pipe and the bladder, the bladder having a vent opening connected to the tank about an air vent provided at an upper end of the tank for venting air bubbling through the perforations defined in the internal pipe, and wherein the bladder further has a drain opening connected to the tank about a drain valve at a bottom end of the tank for allowing removal of dirt particles flowing through the perforations of the internal pipe.

11. The unit defined in claim 10, wherein the internal pipe includes a chimney connected to the air vent, and wherein a coalescing media is provided in the chimney.

12. The unit defined in claim 11, wherein the coalescing media is provided in the form of a cartridge of mesh material.

13. The unit defined in claim 10, wherein the internal pipe has an invert T-shaped configuration including an upstanding leg connected to the air vent, and wherein a cartridge of coalescing media is positioned in the upstanding leg of the internal pipe.

14. The unit defined in claim 10, wherein the perforations in the internal pipe comprise elongated slots having a longitudinal axis which is transversal to a flow direction of the heat transfer fluid through the internal pipe.

15. The unit defined in claim 10, wherein the bladder has 4 points of attachment to the tank, a first one being at the air vent, a second one being at the drain valve, a third one being at the heat transfer fluid inlet, and a fourth one being at the heat transfer fluid outlet.

16. The unit defined in claim 13, wherein the upstanding leg of the internal pipe has side openings defined at an upper distal end thereof, said side openings fluidly linking the variable internal volume of the bladder to the air vent.

17. The unit defined in claim 10, wherein the internal pipe has an invert T-shaped configuration including an upstanding leg connected to the air vent, and wherein a baffle is provided in the internal pipe at a bottom end of the upstanding leg.

* * * * *